UNITED STATES PATENT OFFICE.

STEPHEN M. ALLEN, OF DUXBURY, MASSACHUSETTS.

COMPOSITION OF MATTER FOR MAKING MOLDED ARTICLES.

SPECIFICATION forming part of Letters Patent No. 337,472, dated March 9, 1886.

Application filed November 20, 1885. Serial No. 183,443. (No specimens.)

*To all whom it may concern:*

Be it known that I, STEPHEN M. ALLEN, a resident of Duxbury, in the county of Plymouth and State of Massachusetts, have invented a new and useful Improvement in Compositions of Matter for Making Molded and other Articles, which improvement is fully set forth in the following specification.

This invention has reference to the production of a plastic substance or composition of matter somewhat similar in properties and appearance to hard rubber, but better adapted than that material to a great variety of uses.

The new composition, besides being waterproof and a non-conductor of heat, is very valuable as an insulator of electricity, and being very hard, dense, and durable, and capable, moreover, of being molded or cast into any desired shape, it is very suitable for the manufacture of insulators for electric wires as well as for certain parts of electric instruments, (as telegraphic keys,) and of devices connected therewith. It is also useful as a substitute for hard rubber in numerous other articles.

The present invention is in some respects similar to and may therefore be regarded as an improvement on the inventions heretofore patented to me in Letters Patent No. 278,481, dated May 29, 1883, and No. 284,794, dated September 11, 1883, wherein are described mixtures of certain resinous or albuminous water-proof materials (such as asphalt and the like) with animal or vegetable fiber (dried wood pulp, for example) as a material for roofing and similar purposes for insulating pipes and the like.

According to the present invention I mix with the asphalt, resin, or equivalent substance, a small quantity of a non-volatile oil of animal, vegetable, or mineral origin. The oil most suitable for this purpose is that derived from asphalt or bitumen, but other non-volatile oils could be used instead. This oil improves the product greatly by increasing its elasticity and flexibility.

I also employ in the present invention a larger proportion of fiber than heretofore used.

One difficulty heretofore encountered in attempting to mix fiber thoroughly with the resinous or gummy paste is that the attrition incident to mixing in a mass so dense causes the fibers to be broken up into short lengths, thereby impairing the strength and durability of the product. This difficulty is obviated by wetting or moistening the fiber before stirring it into the paste, whereby the length of the fibers is preserved and the solidity and strength of the composition greatly improved. After the fiber has been thoroughly mixed in, the water is removed by evaporation.

In some cases it is desirable to add to the mixture, before cooling and compressing, a small quantity of rubber; but this is not essential.

In order that the invention may be fully understood, I will describe in detail the manner in which the same is or may be carried into effect.

To a suitable quantity—say one hundred pounds—of asphalt, coal-tar, pitch, or equivalent material is added about ten pounds (more or less) of a suitable non-volatile oil, (such as Trinidad asphalt-oil.) The mixture is then melted, and to it is added, say, seven hundred pounds of wood pulp, (or other vegetable or animal fiber,) which has been previously saturated with water or spirits. The mass is thoroughly mixed and the temperature then raised to or above the boiling-point until the moisture is driven off. The composition is now ready to be cast or compressed into any desired form. When cold and consolidated under pressure, it presents a hard and dense surface similar to hard rubber, and is exceedingly tough and durable.

Before compressing and cooling the mixture a small quantity, say five pounds, of rubber or equivalent material, may be added.

For insulating purposes animal fiber is preferable, though that of vegetable origin—such as wood pulp—answers well.

It will be understood that the invention is not restricted to the exact proportions or materials above specified, which are given by way of example only, and may be varied without departing from the spirit of the invention.

The composition described may be cast into sheets, bars, or other forms, or may be molded into insulators for electric lines, telegraph-keys, cases, and other parts of telephones or other electrical appliances or apparatus; or it may be applied as an insulating coating to electric wires. It may also be used for a variety of other articles where hard rubber, ebonite, horn, and like substances are employed—such as door-knobs, handles for bicycles, and the like.

I claim—

1. The composition herein described, consisting of a mixture of asphalt, resin, or equivalent substance, non-volatile oil, and animal or vegetable fiber, in substantially the proportions set forth.

2. As a substance for insulating electric wires and for use in the construction of electrical apparatus, a composition of asphalt or like material, non-volatile oil, and animal or vegetable fiber mixed together and cast or molded into the desired shape, substantially as described.

3. In the manufacture of a composition of resinous or gummy matter and animal or vegetable fiber, the improvement consisting in moistening or wetting the fiber preparatory to mixing it with the resinous or gummy matter, substantially as and for the purpose set forth.

In testimony whereof I have signed this specification in the presence of two subscribing witnesses.

STEPHEN M. ALLEN.

Witnesses:
WILLIAM B. LAWRENCE,
HORACE G. ALLEN.